T. HEINEMAN.

Safe.

No. 9,305. Reissued July 20, 1880.

Attest.
John A. Fisher
Jeremiah F. Durbig.

Inventor.
Tim Mfg Heineman

UNITED STATES PATENT OFFICE.

TIMOTHY HEINEMAN, OF COVINGTON, KENTUCKY.

SAFE.

SPECIFICATION forming part of Reissued Letters Patent No. 9,305, dated July 20, 1880.

Original No. 175,282, dated March 28, 1876. Application for reissue filed October 4, 1879.

*To all whom it may concern:*

Be it known that I, TIMOTHY HEINEMAN, of Covington, in the county of Kenton and State of Kentucky, have invented a new and useful Improvement in Safes, which improvement is fully set forth in the following specification, reference being had to the accompanying drawings.

The object of this invention is to provide a cheap and convenient safe-box built into and and firmly anchored within the walls of dwelling-houses, so as to form, in connection with said walls and a fire-proof cement by which it is held in place, a safe and fire-proof receptacle for papers and other valuables without disfiguring or interfering with the finish of the walls of the room.

Figure 1:
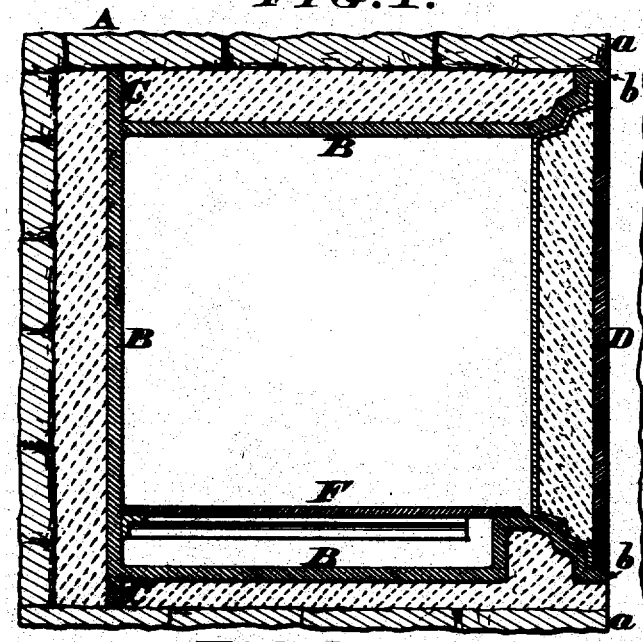
Figure 4:
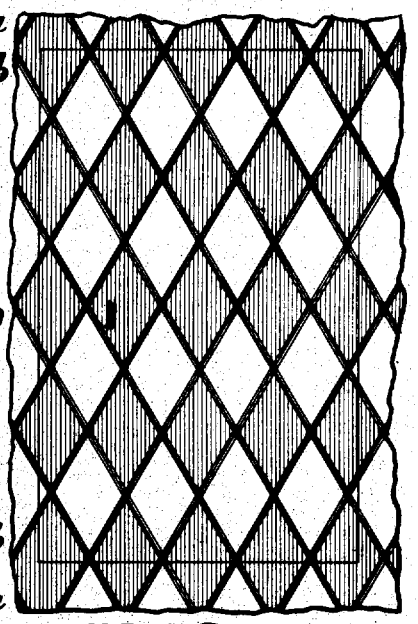
Figure 2:
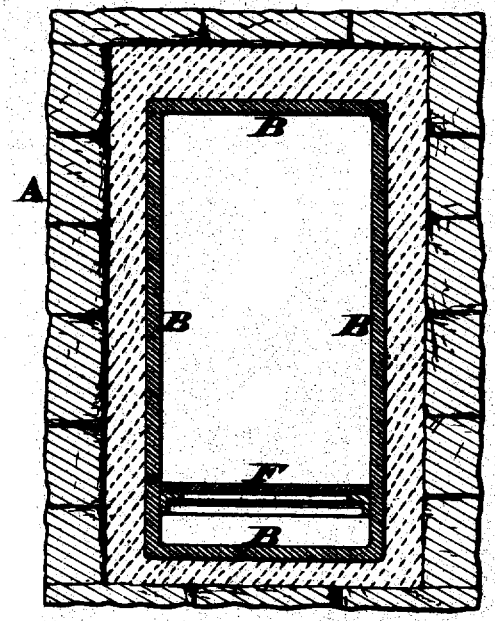
Figure 3:
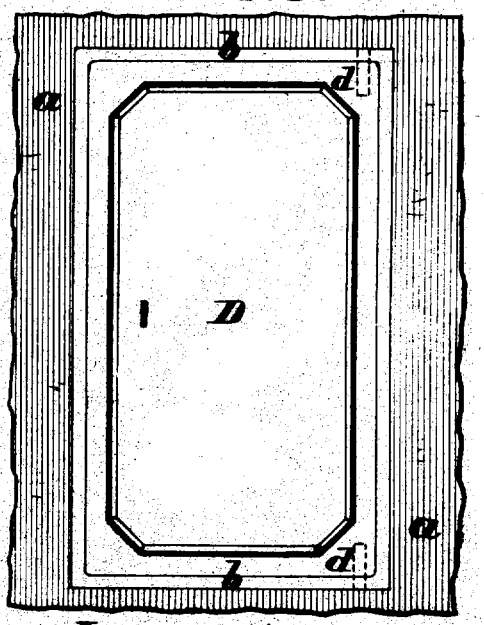

In the drawings, Figure 1 is a longitudinal vertical section of the safe fitted to its position in the wall. Fig. 2 is a transverse vertical section taken at right angles to the view shown in Fig. 1, and Fig. 3 is a front plan view of the safe. In Figs. 1 and 2 the body of the safe is shown by the sectional shade-lines surrounded by fire-proof cement covering. Fig. 4 is a front view of the safe with its face papered to correspond with the wall of the room, in order that it may not attract attention. The door is also filled with the same material between its inner and outer plates.

A is the wall of the building into which the safe is fitted, having its front surface, *a a*, flush with the surface of the safe. B B B is the wall of the safe, surrounded upon each side, upon the outer part, between it and the wall of the building, with a fire-proof cement or equivalent non-conducting material. Asbestus is a good non-conducting material to be used when not too expensive.

C C are flanges projecting from the side of the safe and firmly anchored thereto, so that when the cement or non-conducting material is packed about the safe, between its walls and the wall of the building, it will be impossible for the safe to be removed.

D is the door of the safe, its outer surface being exactly flush with the exterior portion of the walls of the safe, *b b*, and the wall of the room, as shown in Fig. 1. This door is hung upon concealed hinges *d d*. I have shown these as pins or bolts projecting inward from the wall or frame of the safe and into the upper and lower part of the door, near one side. These should be placed just far enough from the wall of the safe so that the door may swing freely upon them, and when closed make an invisible hinge, and bring the face of the door flush with the surface of the wall.

The interior of the safe may be fitted with shelves, drawers, or pigeon-holes, according to the taste of the user or the purpose for which it is intended, and a separate drawer or compartment may be formed in the lower part, covered by a false bottom, as shown at F, Figs. 1 and 2, if it is desirable.

This safe is intended to be built into the chimney-wall, either over the mantel-piece or at the side, where there is always ample space between the flue and the outer wall, though it is obvious that where the wall of the building is of brick it could be inserted therein with equal efficacy, the object being to place it in such place that it will be accessible and can have a fire-proof surrounding. In seating it in position, the face of the door is brought flush with the line of the wall and held in proper position while the cement is poured in above, a sufficient opening having been left between the top edge of the safe and the wall for this purpose until the space which is left between the brick-work and the body of the safe is completely filled with it.

The front of the safe may be finished to correspond with the finish of the wall, whether it be papered or colored, leaving only the key-hole and the joints of the door exposed, so that its presence does not mar the wall or take up any of the available space of the room, as shown at Fig. 4. One of the advantages of this finish is that, where the entire surface of the wall is papered after the safe is put in, the paper becoming dry, and a sharp knife being taken to cut the line between the safe-door and the wall and to cut the line for the key-hole, the door may then be opened and closed, and when closed will present the same appearance as any other part of the room, so that if a burglar should enter, the place occupied by the safe will be impossible of discovery, except upon the closest examination.

If it is not desired to conceal the safe it may have a border finish, as shown in Fig. 3.

In addition to the door being made fire-proof it may be made burglar-proof after any of the well-known modes, if it is desired.

I claim—

1. The herein-described vault, composed of a complete metallic safe-body provided with a door in one side and with outwardly-extending flanges at the front and rear, and built in a fire-proof cement setting into and flush with the wall of a house, substantially as and for the purpose specified.

2. In combination with the wall of a building, a metal safe provided with external flanges and seated in the wall and a filling of fire-proof cement seated in the wall around the safe and its flanges, substantially as described and shown.

3. As a new article of manufacture, a safe for domestic use consisting of a closed metal body provided with a side door and with front and rear flanges C, as and for the purpose described.

4. A safe for domestic use embracing the following elements: a close metallic body, external flanges upon said body to hold the same in position, and a door located in and flush with the side of the body and sustained by concealed hinges, said parts being constructed substantially as described and shown.

TIMOTHY HEINEMAN.

Witnesses:
JOHN A. FISCHER,
JEREMIAH F. TWOHIG.